US009034998B2

(12) United States Patent
Faust et al.

(10) Patent No.: US 9,034,998 B2
(45) Date of Patent: May 19, 2015

(54) POLYMERIZATION INITIATING SYSTEM AND METHOD TO PRODUCE HIGHLY REACTIVE OLEFIN FUNCTIONAL POLYMERS

(75) Inventors: Rudolf Faust, Lexington, MA (US); Philip Dimitrov, Lowell, MA (US); Rajeev Kumar, Lowell, MA (US); Jacob Emert, Brooklyn, NY (US); Jun Hua, Highland Park, NJ (US)

(73) Assignees: University of Massachusetts, Boston, MA (US); Infineum Internatonal Limited, Abington (GB)

( * ) Notice: Subject to any disclaimer, the term of this patent is extended or adjusted under 35 U.S.C. 154(b) by 0 days.

(21) Appl. No.: 13/328,569

(22) Filed: Dec. 16, 2011

(65) Prior Publication Data

US 2013/0158217 A1   Jun. 20, 2013

(51) Int. Cl.
| C08F 4/00 | (2006.01) |
| C08F 2/00 | (2006.01) |
| C08F 4/14 | (2006.01) |
| C08F 210/00 | (2006.01) |
| C08F 10/00 | (2006.01) |
| C08F 110/10 | (2006.01) |

(52) U.S. Cl.
CPC .................................. C08F 110/10 (2013.01)

(58) Field of Classification Search
USPC .......................... 526/90, 348, 348.7, 237, 210
See application file for complete search history.

(56) References Cited

U.S. PATENT DOCUMENTS

| 2,682,531 A | 6/1954 | Ernst et al. |
| 3,850,897 A | 11/1974 | Priola et al. |
| 5,254,649 A | 10/1993 | Miln et al. |
| 5,408,018 A | 4/1995 | Rath |
| 5,663,470 A | 9/1997 | Chen et al. |
| 5,710,225 A | 1/1998 | Johnson et al. |
| 6,211,312 B1 | 4/2001 | Holtcamp |
| 6,346,585 B1 | 2/2002 | Johnson et al. |
| 6,407,170 B1 | 6/2002 | Johnson et al. |
| 6,407,186 B1 | 6/2002 | Rath et al. |
| 6,441,110 B1 | 8/2002 | Sigwart et al. |
| 6,562,913 B1 | 5/2003 | Baxter, Jr. et al. |
| 6,683,138 B2 | 1/2004 | Baxter, Jr. et al. |
| 6,753,389 B1 | 6/2004 | Rath et al. |
| 6,846,903 B2 | 1/2005 | Wettling et al. |
| 6,939,943 B2 | 9/2005 | Wettling et al. |
| 7,038,008 B2 | 5/2006 | Wettling et al. |
| 7,217,773 B2 | 5/2007 | Rath et al. |
| 7,291,758 B2 | 11/2007 | Bohnenpoll et al. |
| 7,683,194 B2 | 3/2010 | Krossing et al. |
| 2004/0059076 A1 | 3/2004 | Webb et al. |
| 2008/0293900 A1 | 11/2008 | Hanefeld et al. |
| 2009/0318624 A1 | 12/2009 | Storey et al. |
| 2011/0201772 A1 | 8/2011 | Konig et al. |
| 2012/0165473 A1 | 6/2012 | Koenig |
| 2014/0275453 A1 | 9/2014 | Emert et al. |

FOREIGN PATENT DOCUMENTS

| CN | 101955558 | * | 1/2011 |
| CN | 101955558 A1 | | 1/2011 |
| EP | 0 436 775 A2 | | 7/1991 |
| EP | 0489508 A2 | | 6/1992 |
| EP | 2 604 635 A1 | | 6/2013 |
| WO | WO 94/19380 | | 9/1994 |
| WO | 99/07753 A1 | | 2/1999 |
| WO | WO 2004/058828 A1 | | 7/2004 |
| WO | WO 2006/074211 A1 | | 7/2006 |
| WO | 2008/095933 A1 | | 8/2008 |
| WO | WO 2009/120551 A1 | | 10/2009 |
| WO | 2010/139684 A1 | | 12/2010 |
| WO | 2011/054785 A1 | | 5/2011 |
| WO | WO 2013/090764 A1 | | 6/2013 |

OTHER PUBLICATIONS

Kennedy, et. al., "New Telechelic Polymers and Sequential Copolymers by Polyfunctional Initiator-Transfer Agents (Inifers)," Polymer Bulletin (1), pp. 575-580, 1979.

Liu, et. al., "A cost-effective process for highly reactive polyisobutylenes via cationic polymerization coinitiated by AlCl3," Polymer (51), pp. 5960-5969, 2010.

Morgan, et. al., "Sulfonium Ion Adducts from Quasiliving Polyisobutylene and Mono- or Disulfides," Macromolecules (42), pp. 2344-2352, 2009.

Nielsen, et. al., "Synthesis of Isobutenyl-telechelic polyisobutylene by functionalization with isobutenyltrimethylsilane," Polymer (38), pp. 2529-2534, 1997.

Simison, et. al., "End-Quenching of Quasiliving Carbocationic Isobutylene Polymerization with Hindered Bases: Quantitative Formation of exo-Olefin-Terminated Polyisobutylene," Macromolecules (39), pp. 2481-2487, 2006.

Vasilenko, et. al., "Cationic Polymerization of Isobutylene Using AlCl3Bu2 as a Coinitiator: Synthesis of Highly Reactive Polyisobutylene," Macromolecules (43), pp. 5503-5507, 2010.

International Search Report and Written Opinion dated Mar. 21, 2013, from corresponding Application No. PCT/US2012/069822.

European Search Report dated Mar. 22, 2013, from corresponding Application No. 11194680.2-1301.

Shiman, D.I. et al., "Cationic Polymerization of Isobutylene by AlCl3/ether Complexes in Non-Polar Solvents: Effect of Ether Structure on the Selectivity of β-H Elimination," Polymer, 54: 2235-2242, (2013).

European Search Report for European Application No. 14157689.2, entitled: "Polymerization Initiating System and Method to Produce Highly Reactive Olefin Functional Polymers," Dated: May 15, 2014.

Non-Final Office Action for U.S. Appl. No. 13/796,405; Date Mailed: Jan. 30, 2014.

(Continued)

*Primary Examiner* — William Cheung
(74) *Attorney, Agent, or Firm* — Hamilton, Brook, Smith & Reynolds, P.C.

(57) ABSTRACT

A method for producing highly reactive olefin polymers wherein at least 50 mol. % of the polymer chains have terminal double bonds, and a novel polymerization initiating system for accomplishing same.

19 Claims, No Drawings

(56) References Cited

OTHER PUBLICATIONS

International Preliminary Report on Patentability for PCT/US2012/069822: entitled "Polymerization Initiating System and Method to Produce Highly Reactive Olefin Functional Polymers," Dated Jun. 17, 2014.

Final Office Action for U.S. Appl. No. 13/796,405, date mailed: Aug. 21, 2014.

* cited by examiner

POLYMERIZATION INITIATING SYSTEM AND METHOD TO PRODUCE HIGHLY REACTIVE OLEFIN FUNCTIONAL POLYMERS

The invention is directed to a method for producing highly reactive olefin polymers wherein at least 50 mol. % of the polymer chains have terminal double bonds, and a novel polymerization initiating system for accomplishing same.

BACKGROUND OF THE INVENTION

The carbocationic polymerization of isobutylene (IB) is the subject of great scientific and industrial interest. The unique properties of polyisobutylene (PIB), a chemically stable fully saturated polymer make it a desirable material with applications ranging from medical devices to ashless (metal-free) dispersants/detergents suitable for use as motor oil and fuel additives. These ashless dispersants/detergents can be characterized as oil soluble surfactants with oligoamine end-groups derived from low molecular weight (number average molecular weight ($\overline{M}_n$) of from about 500 to about 5000) PIB or polybutenes (copolymers of IB with $C_4$ olefins) having olefinic end groups.

Two major industrial methods have been developed to produce low molecular weight IB homo or copolymers with olefinic end groups. The "conventional" method uses a $C_4$ mixture and an aluminum halide based catalyst system and produces polybutenes with high tri-substituted olefinic contents. Due to the low reactivity of the tri-substituted olefinic end groups, polybutenes need to be chlorinated to react with maleic anhydride to give polybutenylsuccinic anhydride, which is subsequently reacted with oligoalkylenimines to yield polybutenylsuccinimide-type ashless dispersant/detergent. The other method employs a pure IB feed stream and a $BF_3$ complex-based catalyst with either alcohols, or ethers in a polymerization reaction run at low temperature, which yields highly reactive PIB (HR PIB) with high exo-olefinic end-group contents. In contrast to the tri-substituted olefins of conventional polybutenes, PIB exo-olefins readily react with maleic anhydride in a thermal "ene" reaction to produce PIB succinic anhydride and subsequently polyisobutenylsuccinimide ashless dispersants. Because the final product does not contain chlorine, HR PIB is more desirable than conventional polybutenes. However, $BF_3$ is difficult to handle and the polymer may contain fluorine. Further, as noted above, this method requires a pure IB feed steam and low temperature (e.g., −30° C.) and therefore results in a more expensive product.

The above-described commercial process for producing HR PIB has been reported by U.S. Pat. No. 5,408,018 (and DE-A 2702604) to Rath. A range of process enhancements were subsequently reported in. U.S. Pat. Nos. 6,407,186, 6,753,389, and 7,217,773 to Rath et al. and U.S. Pat. Nos. 6,846,903, 6,939,943 and 7,038,008 to Wettling et al. A modified process using a different temperature regime and a low residence time was also previously described (e.g., U.S. Pat. Nos. 6,562,913 and 6,683,138 to Baxter et al.). All of these disclosures describe polymerizations carried out with $BF_3$ catalyst and an alcohol or ether co-catalyst. Such catalytic processes can leave residual fluorine in the polymer especially when utilized with the commonly available mixed $C_4$ Raffinate I stream. The presence of even small amounts of fluorine cause problems in downstream functionalization reactors due to the release of HF and therefore require expensive fluorine removal post-treatment.

Many attempts have therefore been made to find other methods for producing HR PIB. For instance PIB with nearly quantitative exo-olefin endgroup has been obtained by reacting tent-chloride-terminated PIB (PIB-Cl) with strong bases such as potassium tert-butoxide and alkali ethoxides in refluxing tetrahydrofuran (THF) for 20-24 h, (Kennedy, J. P.; Chang, V. S. C.; Smith, R. A.; Ivan, B. *Polym. Bull.* 1979, 1, 575); quenching living PIB with methallyltrimethylsilane, (Nielsen, L. V.; Nielson, R. R.; Gao, B.; Kops, J.; Ivan, B. *Polymer* 1997, 38, 2528.); quenching living PIB with a hindered base (e.g., 2,5-dimethylpyrrole or 1,2,2,6,6-pentamethylpiperidine), (Simison, K. L.; Stokes, C. D.; Harrison, J. J.; Storey, R. F. *Macromolecules* 2006, 39, 2481); quenching living PIB with an alkoxysilane or an ether compound (Storey, R. F.; Kemp, L. L. U.S. Patent Application Publication, 2009/0318624 A1, Dec. 24, 2009);and reacting living PIB with a mono-sulfide followed by decomposition of the resulting sulfonium salt with a base (Morgan. D. L.; Stokes, C. D.; Meierhoefer, M. A.; Storey, R. F. *Macromolecules* 2009, 42, 2344). However, all of the above methods are expensive as they involve living cationic polymerization at low temperature in a moderately polar solvent and employ expensive reactants.

A broad disclosure of halogen-free metal catalysts based on oxides of Groups V and VI of the Periodic Table of Elements was described in U.S. Pat. No. 6,441,110 to Sigwart et al., but these catalysts were heterogenous and gave poor monomer conversions, with only modest amounts of exo-olefins. Another catalyst system, based on metals from the $3^{rd}$ to the $12^{th}$ periods of the periodic system of elements with nitrile ligands and weakly coordinating anions was described in U.S. Pat. No. 7,291,758 to Bohnepoll et al. These catalysts were used only in a polar dichloromethane solution; not in an apolar, all-hydrocarbon media.

More recently it has been reported that $AlCl_3$—$OBu_2$ complexes in conjunction with a range of initiators or adventitious water initiate the polymerization of IB and in polar solvent ($CH_2Cl_2$/hexane 80/20 v/v) yield PIB with high exo-olefinic end groups up to 95% in a range of temperatures (−60 to −20° C.) (Vasilenko, I. V.; Frolov, A. N.; Kostjuk, S. V. *Macromolecules* 2010, 43(13), 5503-5507). Independently, similar results were reported with adventitious water as initiator in conjunction with $AlCl_3$ or $FeCl_3$ dialkyl ether complexes in $CH_2Cl_2$ at temperatures ranging from −20 to 20° C. (Lui, Q.; Wu Y.; Zhang, Y.; Yan. P. F.; Xu, R. W. *Polymers* 2010, 51, 5960-5969). However, due to the need for the polar solvent $CH_2Cl_2$ the commercial potential of this method is questionable. $AlCl_3$—$OBu_2$ has been reported to produce PIB with terminal vinylidene bonds in the absence of solvent and without added initiator, or with water as an added initiator (USPG 2011/0201772A1 of Konig et al.). However, none of the conventional cationic initiators such as alkyl halides, ethers, esters, alcohols and Bronsted acids were found to initiate directly the polymerization in apolar media with $AlCl_3$. Therefore there remains a need for a robust and economic method for the preparation of highly reactive PIB or polybutene in a non-polar hydrocarbon media.

SUMMARY OF THE INVENTION

It has now been found that conventional cationic initiators used in conjunction with certain combinations of Lewis acid/Lewis base complexes initiate the polymerization of IB in hydrocarbon solvents at temperatures of −30° C. to +50° C. and provide high yields of highly reactive PIB.

The catalyst of the catalyst-initiator system of the present invention comprises a Lewis acid catalyst ($MR''Y_n$) complexed to a Lewis base (B) in an apolar medium. The affinity of the Lewis acid for the Lewis base should be such that the Lewis acid can interact at least partially with a conventional cationic initiator (RX) enabling the formation of R⁺, which initiates cationic polymerization of isobutylene. The initially complexed Lewis base should be capable of effecting rapid deprotonation of the growing carbocation chain to form an exo-olefin prior to isomerization of the cationic chain or diffusion of the base into free solution. If the Lewis base does not complex to the Lewis acid, at least initially, deprotonation of the growing carbocation will not be sufficiently rapid relative to isomerization to give the desired high yields of exo-olefin. If the interaction of the Lewis acid and the Lewis base is so strong that it prevents interaction with a conventional initiator, polymerization will be inefficient or not occur at all. The Lewis acid or Lewis acid-Lewis base complex must further be capable of interacting with a conventional initiator either in the presence or absence of adventitious water. Catalysts with which monomer conversion is substantially dependent on adventitious water, even in the presence conventional initiators, as evidenced by complete loss of conversion in the presence of a proton trap (e.g., 2,6-ditert-butylpyridine or "DTBP"), are not suitable.

DETAILED DESCRIPTION OF THE INVENTION

Lewis acid catalysts useful in the practice of the present invention can be represented by the general formula $(MR''_m Y_n)$, wherein M is selected from Fe, Ga, Hf, Zr and W; preferably Ga or Fe, more preferably Ga; R" is a hydrocarbyl group, preferably a $C_1$ to $C_8$ hydrocarbyl group, more preferably a $C_1$ to $C_8$ alkyl group; m is 0 or an integer of 1 to 5, preferably 0 or 1, more preferably 0; Y is halogen (F, Cl, Br), preferably either Cl or Br, more preferably Cl, and n is an integer of 1 to 6, preferably 3 to 5; with the proviso that m+n is equal to the valency of M. As used herein, the term "hydrocarbyl" means a chemical group of a compound that contains hydrogen and carbon atoms and that is bonded to the remainder of the compound directly via a carbon atom. The group may contain one or more atoms other than carbon and hydrogen ("hetero atoms") provided they do not affect the essentially hydrocarbyl nature of the group.

The Lewis base (B) is selected from oxygen- and/or sulfur-containing nucleophiles, such as ethers, alcohols, ketones, aldehydes and esters, and sulfur-containing nucleophiles such as thioethers and thioketones. Specific examples of suitable Lewis bases include acyclic dihydrocarbyl ethers, wherein each hydrocarbyl group is independently selected from $C_1$ to $C_{12}$ hydrocarbyl, cyclic ethers having a 5 to 7 membered cyclic group, dihydrocarbyl ketones, wherein each hydrocarbyl group is independently selected from $C_1$ to $C_{12}$ hydrocarbyl, $C_1$ to $C_{12}$ aliphatic alcohols, $C_1$ to $C_{12}$ aliphatic aldehydes, acyclic aliphatic esters wherein each hydrocarbyl group is independently selected from $C_1$ to $C_{12}$ hydrocarbyl, cyclic aliphatic esters having a 5 to 7 membered cyclic group, dihydrocarbyl sulfides, wherein each hydrocarbyl group is independently selected from $C_1$ to $C_{12}$ hydrocarbyl and dihydrocarbyl thiocarbonyl compounds, wherein each hydrocarbyl group is independently selected from $C_1$ to $C_{12}$ hydrocarbyl. The hydrocarbyl groups of the above Lewis bases are preferably alkyl groups and are more preferably $C_1$ to $C_4$ alkyl. The hydrocarbyl groups and cyclic aliphatic groups of the above Lewis bases may each independently be substituted with a heteroatom or a heteroatom-containing moiety and may further be substituted with other substituent groups that do not interfere significantly with the ability of such compounds to function as a Lewis base (e.g., $C_1$ to $C_4$ "lower alkyl" groups).

An "initiator" is defined as a compound that can initiate polymerization, in the presence or absence of adventitious water and in the presence of a proton trap. The initiator of the present invention (RX) comprises a hydrocarbyl R group wherein the carbon linking group R to X is tertiary, benzylic or allylic, which hydrocarbyl group can form a stable carbocation (e.g., t-butyl⁺), and an X group, which is a halogen.

The polymerization medium must be a substantially or completely apolar medium, such as a mixture of hexanes or saturated and unsaturated $C_4$ hydrocarbons.

In the polymerization process of the present invention, the feedstock may be pure isobutylene or a mixed $C_4$ hydrocarbyl feedstock containing isobutylene, such as a $C_4$ cut resulting from the thermal or catalytic cracking operation of, for example, naphtha. Thus, suitable feedstocks will typically contain at least 10%, and up to 100% isobutylene, by mass, based on the total mass of the feed. In addition to isobutylene, conventional $C_4$ cuts suitable for use as feedstocks that are of industrial importance typically will contain between about 5% and about 50% butene-1, between about 2% and about 40% butene-2, between about 2% and about 60% iso-butane, between about 2% and about 20% n-butane, and up to about 0.5% butadiene, all percentages being by mass, based on the total feed mass. Feedstocks containing isobutylene may also contain other non-$C_4$ polymerizable olefin monomers in minor amounts, e.g., typically less than 25%, preferably less than about 10%, and most preferably less than 5%, such as propadiene, propylene and $C_5$ olefins. The $C_4$ cut may be purified by conventional means to remove water, polar impurities and dienes.

The term "polybutene", as employed herein is intended to include not only homopolymers of isobutylene, but also copolymers of isobutylene and one or more other $C_4$ polymerizable monomers of conventional $C_4$ cuts as well as non-$C_4$ ethylenically unsaturated olefin monomers containing 5 carbon atoms, provided such copolymers contain typically at least 50%, preferably at least 65%, and most preferably at least 80% isobutylene units, by mass, based on the polymer number average molecular weight ($\overline{M}_n$).

The Lewis acid and Lewis base can be complexed by, for example, dissolving the Lewis acid in a solvent (e.g., dichloromethane or 1,2-dichloroethane) to form a solution and then adding the Lewis base to the solution, while the solution is stirred. The complex may be added to the polymerization medium with the solvent; alternatively, the solvent may be removed prior to the addition of the complex to the polymerization medium.

The molar ratio of Lewis acid to Lewis base in the complex will typically be maintained within a range of from about 1:0.5 to about 1:2, preferably from about 1:0.7 to about 1:1.5, more preferably from about 1:0.8 to about 1:1.2, such as from about 1:0.9 to about 1:1.1 or 1:1.

The amount of the Lewis acid-Lewis base complex employed in the process of the present invention can be controlled, in conjunction with the concentration of initiator and monomer, reaction time and temperature, to achieve the target $\overline{M}_n$ of the polybutene polymer product, the conversion of butene and yield of polybutene. In view of the above, the Lewis acid-Lewis base complex is typically employed in an amount sufficient to contact the butene monomer in a liquid phase reaction mixture at a concentration of millimoles of Lewis acid-Lewis base complex per liter of reaction mixture of from about 1 mM to about 200 mM, preferably from about 5 mM to about 100 mM, and more preferably from about 10 mM to about 50 mM, such as from about 10 mM to about 30 mM.

The initiator will typically be employed in an amount sufficient to contact the butene monomer in a liquid phase reaction mixture at a concentration of millimoles of initiator per liter of medium, and independent from the amount of Lewis acid-Lewis base complex, of from about 1 mM to about 200 mM, preferably from about 5 mM to about 100 mM, and more preferably from about 10 mM to about 50 mM, such as from about 10 mM to about 30 mM.

The polymerization reaction can be conducted batch-wise, semi-continuously, or continuously. On an industrial scale, the polymerization reaction is preferably conducted continuously. Conventional reactors, such as tubular reactors, tube-bundle reactors or loop reactors, ie, tube or tube-bundle reactors with continuous circulation of the reaction material, may be used.

The polymerization reaction is conducted in the liquid phase to induce linear or chain-type polymerization, as opposed to ring or branch formation. Thus, if a feed is used that is gaseous under ambient temperature, it is preferred to control the reaction pressure and/or dissolve the feed in an inert solvent or liquid diluent, in order to maintain the feed in the liquid phase. Typical $C_4$ cuts comprising the feed are liquid under pressure and do not require a solvent or diluent. Typical diluents suitable for use with the process include $C_3$ to $C_6$ alkanes, such as propane, butane, pentane, isobutane and the like.

The Lewis acid-Lewis base complex is typically introduced into the reactor as a liquid partially or completely dissolved in a solvent, or as a solid. Polymerization is preferably conducted at a pressure sufficient to maintain the $C_4$ feed in a liquid state at the reaction temperature, or at higher pressures. The initiator may be introduced to the monomer feed or the reaction mixture in liquid form together with the Lewis acid-Lewis base complex or, preferably, is introduced to the monomer feed or the reaction mixture in liquid form by a line separate from the Lewis acid-Lewis base complex addition line.

The liquid phase reaction mixture temperature is controlled by conventional means to be typically from about $-30°$ C. to about $+50°$ C., preferably from about $-10°$ C. to about $+30°$ C., more preferably from $0°$ C. to about $+20°$ C., such as from $0°$ C. to about $+10°$ C.

The residence time of the butene to be polymerized may be from about 5 seconds to several hours, but will typically be from about 1 to about 300 minutes, such as 2 to about 120 minutes, preferably from about 5 to about 60 minutes.

In order to insure even distribution of the catalyst within the reactor, turbulent flow of the reactor contents can be generated by mixing, or with suitable baffles, such as baffle plates or oscillating baffles, or by dimensioning the reactor tube cross sections so that a suitable flow velocity is established.

The process of the present invention is typically conducted in a manner achieving an isobutylene conversion in the range of from about 20% up to about 100%, preferably from about 50% to about 100%, and more preferably from about 70% to about 100%. The combined use of temperature control and catalyst feed rate permits formation of polybutenes having a $\overline{M}_n$ of from about 400 Daltons to about 4000 Daltons, preferably from about 700 Daltons to about 3000 Daltons, more preferably from about 1000 Daltons to about 2500 Daltons; a molecular weight distribution (MWD) of typically from about 1.1 to about 4.0, preferably from about 1.5 to about 3.0, an exo-olefin content of greater than 50 mol. %, preferably greater than 60 mol. %, more preferably greater than 70 mol. %, such as from about 80 mol. % to about 95 mol. %; a tetrasubstituted olefin content of less than about 20 mol. %, such as less than about 15 mol. %, preferably less than about 10 mol. %, more preferably less than about 5 mol. %; and a chlorine content of less than about 10 mol. %, such as less than about 5 mol. %, preferably less than about 2 mol. %, more preferably less than about 1 mol. %, based on the total moles of polymer.

Once the target molecular weight of the polymer is achieved, the polymer product can be discharged from the reactor and passed into a medium that deactivates the polymerization catalyst and terminates the polymerization. Suitable deactivation media include water, amines, alcohols and caustics. The polyisobutylene product can then be separated by distilling off the remaining $C_4$ hydrocarbons and low molecular weight oligomers. Preferably residual amounts of catalyst are removed, usually by washing with water or caustic.

This invention will be further understood by reference to the following examples, which are not intended, and should not be construed as listing all possible embodiments within the scope of the invention.

EXAMPLES

Preparation of Lewis Acid (LA) Lewis Base (LB) Complex

All operations were performed in a dry $N_2$ atmosphere MBraun 150-M glove box (Innovative Technology Inc., Newburyport, Mass.). LA (3.9 mmol) was first dissolved in 3.36 ml of dichloromethane in a 20 ml vial equipped with a screw top with a septum. The vial was cooled down to $0°$ C. to form a 1M complex. LB (3.9 mmol) was then added drop wise for 1 minute, while the solution was stirred. The solution was kept at $+25°$ C. and it was used within 1 hour of preparation.

Polymerizations

Polymerization was performed in a dry $N_2$ atmosphere MBraun 150-M glove box (Innovative Technology Inc., Newburyport, Mass.). Yields were determined gravimetrically. Number average molecular weights ($M\overline{M}_n$) and polydispersity indices (PDI) were determined by size exclusion chromatography. The distribution of end-groups was determined by $^1H$ NMR. The amount of unreacted chlorinated PIB (PIB-Cl), which is one indicator of whether the reaction can be driven further to completion, was determined by proton NMR spectroscopy.

Example 1

Comparative

The LA.LB complex $AlCl_3$.dibutyl ether (0.022 M), in a 1:1 molar ratio, was used to polymerize isobutylene (IB) (1 M) in hexanes at $-20°$ C. for 20 minutes. IB and hexanes were premixed in a 75 ml culture tube, equipped with a screw top with septum. The LA.LB complex was added last. Polymerization was quenched using an excess of aqueous $NH_4OH$.

| Monomer Conversion (%) | Mn | PDI | end-group distribution (mol. %) | | | | |
|---|---|---|---|---|---|---|---|
| | | | exo olefins | endo olefins | trisubstituted olefins | tetrasubstituted olefins | PIB-Cl |
| 8 | 1800 | 10 | 86 | 8 | — | 7 | — |

As shown, AlCl$_3$ polymerizes IB in hexanes without added initiator. Initiation is by adventitious water which is inefficient and the amount of which is difficult to control. Monomer conversion was low and polydispersity was high.

Example 2

Comparative

Polymerization of IB was performed as in Example 1 but with the LA.LB complex AlCl$_3$.diisopropyl ether (0.02 M) at 0° C.

| Monomer Conversion (%) | Mn | PDI | end-group distribution (mol. %) | | | | |
|---|---|---|---|---|---|---|---|
| | | | exo olefins | endo olefins | trisubstituted olefins | tetrasubstituted olefins | PIB-Cl |
| 31 | 3400 | 3.6 | 64 | — | — | 23 | — |

Monomer conversion remained low and polydispersity remained high. The higher polymerization temperature increased yield but concurrently resulted in more isomerization.

Example 3

Comparative

The LA.LB complex AlCl$_3$.dibutyl ether (0.022 M), in a 1:1 molar ratio, was used to polymerize IB (1 M) in dichloromethane/hexanes 80/20 (v/v) in the presence of cumyl alcohol (CumOH, 0.018 M) and 2,6-ditert.-butylpyridine (DTBP, 0.006 M) at −40° C. for 3 minutes. IB, hexanes, CumOH, and DTBP were premixed in a 75 ml culture tube, equipped with a screw top with a septum. The LA.LB complex was added last. The polymerization was quenched with excess of aqueous NH$_4$OH.

Monomer conversion: 0%.

No conversion achieved with added initiator when chain transfer is suppressed with DTBP (proton trap) demonstrates that initiation is only via adventitious water. Cumyl alcohol, as added initiator, cannot be ionized by AlCl$_3$ in hexanes.

Example 4

Comparative

Polymerization of IB was performed as in Example 1 but for 60 min.

| Monomer Conversion (%) | Mn | PDI | end-group distribution (mol. %) | | | | |
|---|---|---|---|---|---|---|---|
| | | | exo olefins | endo olefins | trisubstituted olefins | tetrasubstituted olefins | PIB-Cl |
| 21 | 2000 | 8.7 | 82 | 8 | 0 | 10 | — |

Monomer conversion remained low and polydispersity remained high, although polymerization time was increased.

Example 5

Comparative

Polymerization of IB was performed as in Example 4 but in the presence of 2-chloro-2,4,4-trimethylpentane, or "TMPCl" (0.015M).

| Monomer Conversion (%) | Mn | PDI | end-group distribution (mol. %) | | | | |
|---|---|---|---|---|---|---|---|
| | | | exo olefins | endo olefins | trisubstituted olefins | tetrasubstituted olefins | PIB-Cl |
| 21 | 2000 | 2.3 | 79 | 9 | 0 | 11 | — |

Comparing Example 5 to Example 4 demonstrates that TMPCl does not initiate the polymerization when AlCl$_3$ is the LA. Conversion, Mn and end-group distribution remained substantially the same.

Example 6

Comparative

The LA.LB complex AlCl$_3$.diisobutyl ether (0.022 M), in a 1:1 molar ratio, was used to polymerize IB (1 M) in hexanes in the presence of TMPCl (0.015 M) and DTBP (0.006 M) at 0° C. for 20 minutes. IB, hexanes, TMPCl, and DTBP were premixed in a 75 ml culture tube, equipped with a screw top with a septum. The LA.LB complex was added last. The polymerization was quenched with excess of aqueous NH$_4$OH.

Monomer conversion: 0%

As with Example 3, no conversion achieved with added initiator when chain transfer is suppressed with DTBP (proton trap) demonstrating that initiation is only via adventitious water. TMPCl, as added initiator cannot be ionized by AlCl$_3$.diisobutyl ether in hexanes.

Example 7

Comparative

The LA.LB complex AlCl$_3$.diisopropyl ether (0.02 M), in a 1:1 molar ratio, was used to polymerize IB (1 M) in hexanes in the presence of t-butyl alcohol or "tBuOH" (0.015 M) at 0° C. for 20 minutes. IB, hexanes, and tBuOH were premixed in a 75 ml culture tube, equipped with a screw top with a septum. The LA.LB complex was added last. The polymerization was quenched with excess of methanol.

| Monomer Conversion (%) | Mn | PDI | exo olefins | endo olefins | trisubstituted olefins | tetrasubstituted olefins | PIB-Cl |
|---|---|---|---|---|---|---|---|
| 11 | 900 | 2.1 | 92 | 4 | 0 | 4 | 0 | tBuOH as added initiator did not improve conversion relative to Example 2 (adventitious water as initiator), although exo content increased.

Example 8

Comparative

Polymerization of IB was performed as in Example 6, except that cumyl chloride (CumCl) was used instead of TMPCl, and $AlCl_3$·diisopropyl ether was used instead $AlCl_3$·diisobutyl ether.

Monomer conversion: 2%

As with Example 6, no conversion achieved with added initiator when chain transfer is suppressed with DTBP (proton trap) demonstrating that initiation is only via adventitious water. CumCl as added initiator cannot be ionized by $AlCl_3$·diisopropyl ether in hexanes.

Example 9

Comparative

The LA.LB complex $GaCl_3$·diisopropyl ether (0.02 M), in a 1:1 molar ratio, was used to polymerize IB (1 M) in hexanes at 0° C. for 20 minutes. IB and hexanes were premixed in a 75 ml culture tube, equipped with a screw top with a septum. Addition of the LA.LB complex started the polymerization. The polymerization was quenched with excess of aqueous $NH_4OH$.

| Monomer Conversion (%) | Mn | PDI | exo olefins | endo olefins | trisubstituted olefins | tetrasubstituted olefins | PIB-Cl |
|---|---|---|---|---|---|---|---|
| 26 | 1700 | 1.9 | 68 | 16 | 0 | 10 | 5 |

In the absence of initiator, and with initiation via only adventitious water, monomer conversion remained low.

Example 10

Invention

The LA.LB complex $GaCl_3$·diisopropyl ether (0.02 M), in a 1:1 molar ratio, was used to polymerize IB (1 M) in hexanes in the presence of TMPCl, (0.02 M) at 0° C. for 20 minutes. IB, hexanes, and TMPCl were premixed in a 75 ml culture tube, equipped with a screw top with a septum. Addition of the LA.LB complex started the polymerization. The polymerization was quenched with excess of aqueous $NH_4OH$.

| Monomer Conversion (%) | Mn | PDI | exo olefins | endo olefins | trisubstituted olefins | tetrasubstituted olefins | PIB-Cl |
|---|---|---|---|---|---|---|---|
| 100 | 900 | 2.1 | 77 | 9 | 0 | 8 | 7 |

Example 11

Comparative

The LA $GaCl_3$ (0.02 M) was used to polymerize IB (1 M) in hexanes in the presence of TMPCl (0.02 M) and isopropyl ether (0.02 M) at 0° C. for 20 minutes. IB, hexanes, isopropyl ether, and TMPCl were premixed in a 75 ml culture tube, equipped with a screw top with a septum. Addition of 1M solution of $GaCl_3$ in hexane (0.02 M) started the polymerization. The polymerization was quenched with excess of aqueous $NH_4OH$.

| Monomer Conversion (%) | Mn | PDI | exo olefins | endo olefins | trisubstituted olefins | tetrasubstituted olefins | PIB-Cl |
|---|---|---|---|---|---|---|---|
| 82 | 700 | 2.1 | 33 | 0 | 36 | 18 | 14 |

Compare to Example 10. When the Lewis base (isopropyl ether) is not complexed initially to $GaCl_3$, exo-olefin content is reduced due to isomerization and cleavage.

Example 12

Invention

Polymerization of IB was performed as in Example 10, except that 2-chloro-2-methylpropane (tBuCl) was used instead of TMPCl. [tBuCl]=0.01 M.

| Monomer Conversion (%) | Mn | PDI | exo olefins | endo olefins | trisubstituted olefins | tetrasubstituted olefins | PIB-Cl |
|---|---|---|---|---|---|---|---|
| 57 | 1700 | 1.5 | 70 | 8 | 0 | 6 | 16 |

Compare to Example 10. Lower concentration of tBuCl relative to TMPCl resulted in a higher MW and similar exo-olefin content.

Example 13

Comparative

Polymerization of IB was performed as in Example 10, but 2-hydroxy-2-methylpropane (tBuOH) was used instead of TMPCl.

| Monomer Conversion (%) | Mn | PDI | exo olefins | endo olefins | trisub- stituted olefins | tetrasub- stituted olefins | PIB- Cl |
|---|---|---|---|---|---|---|---|
| 4 | 900 | 3.0 | 52 | 0 | 27 | 13 | 0 |

Compare to Example 10. Significant isomerization and cleavage with tBuOH as initiator relative to TMPCl and almost no conversion

Example 14

Invention

Polymerization of IB was performed as in Example 12 except that polymerization time was increased to 40 minutes.

| Monomer Conversion (%) | Mn | PDI | exo olefins | endo olefins | trisub- stituted olefins | tetrasub- stituted olefins | PIB- Cl |
|---|---|---|---|---|---|---|---|
| 77 | 1700 | 1.6 | 80 | 11 | 0 | 7 | 2 |

Compare to Example 12. Longer reaction time increased conversion, reduced PIB-Cl and increased exo-olefin content at constant MW.

Example 15

Comparative

Polymerization of IB was performed as in Example 12, but without TMPCl.

| Monomer Conversion (%) | Mn | PDI | exo olefins | endo olefins | trisub- stituted olefins | tetrasub- stituted olefins | PIB- Cl |
|---|---|---|---|---|---|---|---|
| 26 | 1700 | 1.9 | 68 | 16 | 0 | 10 | 5 |

Compare to Example 12. In the absence of initiator, and with initiation via only adventitious water, monomer conversion is low.

Example 16

Comparative

Polymerization of IB was performed as in Example 15 but in the presence of 2,6-di-tertbutyl pyridine (DTBP); [DTBP] =0.005 M.

| Monomer Conversion (%) | Mn | PDI | exo olefins | endo olefins | trisub- stituted olefins | tetrasub- stituted olefins | PIB- Cl |
|---|---|---|---|---|---|---|---|
| 2 | — | — | 93 | 0 | 0 | 0 | 7 |

Compare to Example 15. Chain transfer is suppressed with DTBP (proton trap), demonstrating that initiation is only via adventitious water.

Example 17

Invention

Polymerization of IB was performed as in Example 10, but in the presence of [DTBP]=0.005 M.

| Monomer Conversion (%) | Mn | PDI | exo olefins | endo olefins | trisub- stituted olefins | tetrasub- stituted olefins | PIB- Cl |
|---|---|---|---|---|---|---|---|
| 30 | 1000 | 1.7 | 67 | 6 | 0 | 5 | 22 |

Compare to Example 10. Yield is reduced but not eliminated by DTBP. MW and exo-olefin content is maintained. Compare to Example 6 with $AlCl_3$ where no conversion was achieved in the presence of DTBP.

Example 18

Invention

Polymerization of IB was performed as in Example 10, but at +10° C.

| Monomer Conversion (%) | Mn | PDI | exo olefins | endo olefins | trisub- stituted olefins | tetrasub- stituted olefins | PIB- Cl |
|---|---|---|---|---|---|---|---|
| 100 | 1000 | 2.1 | 75 | 11 | 0 | 12 | 2 |

Compare to Example 10. Conversions, MW and exo-olefin content maintained at higher temperature.

Example 19

Invention

Polymerization of IB was performed as in Example 10, but at [IB]=4 M.

| Monomer Conversion (%) | Mn | PDI | exo olefins | endo olefins | trisub- stituted olefins | tetrasub- stituted olefins | PIB- Cl |
|---|---|---|---|---|---|---|---|
| 70 | 1900 | 1.7 | 78 | 9 | 0 | 8 | 5 |

Compare to Example 10. Lower molar ratio of catalyst to monomer increased MW and decreased yield, but exo-olefin content is maintained.

Example 20

Invention

Polymerization of IB was performed as in Example 10, but using $GaCl_3$.2,4-dimethyl-3-pentanone LA.LB complex.

| Monomer Conversion (%) | Mn | PDI | exo olefins | endo olefins | trisubstituted olefins | tetrasubstituted olefins | PIB-Cl |
|---|---|---|---|---|---|---|---|
| 65 | 1200 | 1.4 | 81 | 8 | 0 | 7 | 4 |

Compare to Example 10. Ketone is effective as the Lewis base with comparable MW and exo-olefin content, but lower conversion.

Example 21

Comparative

Polymerization of IB was performed as in Example 10, but using GaCl$_3$.triethylamine LA.LB complex.

Monomer conversion: 0%

Compare to Example 10. Triethylamine is not an effective base.

Example 22

Comparative

Polymerization of IB was performed as in Example 10, but using SnCl$_4$.diisopropyl ether LA.LB complex.

Monomer conversion: 0%

Compare to Example 10. SnCl$_4$ is not an effective Lewis acid catalyst.

Example 23

Comparative

Polymerization of IB was performed as in Example 10, but using SbCl$_5$.diisopropyl ether LA.LB complex.

Monomer conversion: 0%

Compare to Example 10. SbCl$_5$ is not an effective Lewis acid catalyst.

Example 24

Invention

Polymerization of IB was performed as in Example 10, using FeCl$_3$.diisopropyl ether LA.LB complex.

| Monomer Conversion (%) | Mn | PDI | exo olefins | endo olefins | trisubstituted olefins | tetrasubstituted olefins | PIB-Cl |
|---|---|---|---|---|---|---|---|
| 47 | 900 | 1.5 | 91 | 4 | 0 | 2 | 3 |

Compare to Example 10. FeCl$_3$ is an effective Lewis acid catalyst with higher exo-olefin content at similar MW, but lower conversion.

Example 25

Invention

The LA.LB complex FeCl$_3$.chloromethyl ethyl ether (0.02 M), in a 1:1 molar ratio, was used to polymerize IB (1 M) in hexanes in the presence of tBuCl (0.02 M) at 0° C. for 20 minutes. IB, hexanes, and tBuCl were premixed in a 75 ml culture tube, equipped with a screw top with a septum. Addition of the LA.LB complex started the polymerization.

The polymerization was quenched with excess of aqueous NH$_4$OH.

| Monomer Conversion (%) | Mn | PDI | exo olefins | endo and trisubstituted olefins | tetrasubstituted olefins | PIB-Cl |
|---|---|---|---|---|---|---|
| 85 | 600 | — | 60 | 14 | 12 | 14 |

Example 26

Polymerization of [IB]=1M, [TMPCl]=0.02 M in hexanes at 0° C. for 20 min. conducted using various Lewis Acid and Lewis Base combinations and complexes In each case, polymerization, was terminated with NH$_4$OH.

| # | LA•LB | [LA•LB] (M) | Soluble complex | INV (I) Comp. (C) | Yield (%) | Mn | PDI | Mn (NMR) | [PIB] (M) | exo (%) | endo (%) | tri (%) | tetra (%) | PIB-Cl (%) |
|---|---|---|---|---|---|---|---|---|---|---|---|---|---|---|
| a | TaCl$_5$•iPr$_2$O | 0.01 | No | C | 4 | | | 2200 | 0.0010 | 17 | | 19 | 22 | 42 |
| b | TaCl$_5$•iPr$_2$O | 0.02 | No | C | 23 | 1600 | 6.9 | 1900 | 0.0071 | 22 | | 34 | 27 | 17 |
| c | MoCl$_5$•iPr$_2$O | 0.01 | Yes | C | 34 | 1000 | 4.8 | 1200 | 0.0169 | 28 | | 30 | 21 | 21 |
| d | MoCl$_5$•iPr$_2$O | 0.02 | Yes | C | 100 | 1400 | 2.9 | 900 | 0.0640 | 28 | | 37 | 22 | 13 |
| e | InCl$_3$•iPr$_2$O | 0.01 | No | C | 0 | | | | | | | | | |
| f | InCl$_3$•iPr$_2$O | 0.02 | No | C | 0 | | | | | | | | | |
| g | GaCl$_3$•tBuOH | 0.01 | Yes | I | 8 | 400 | 1.3 | 460 | 0.0108 | 75 | 10 | | 6 | 9 |
| h | GaCl$_3$•tBuOH | 0.02 | Yes | I | 24 | 900 | 1.2 | 460 | 0.0316 | 82 | 7 | | 5 | 6 |
| i | GaCl$_3$•γBuL* | 0.01 | Yes | I | 16 | | | 600 | 0.0162 | 50 | | 28 | 20 | 2 |
| j | GaCl$_3$•γBuL | 0.02 | Yes | I | 50 | | | 600 | 0.0501 | 48 | | 29 | 21 | 2 |
| k | GaCl$_3$•AcN** | 0.01 | No | C | 5 | | | 1100 | 0.0028 | 17 | | 15 | 9 | 59 |
| l | GaCl$_3$•AcN | 0.02 | No | C | 25 | | | 1100 | 0.0132 | 13 | | 27 | 11 | 49 |
| m | VCl$_3$•iPr$_2$O | 0.01 | No | C | 0 | | | | | | | | | |
| n | VCl$_3$•iPr$_2$O | 0.02 | No | C | 0 | | | | | | | | | |
| o | WCl$_4$•iPr$_2$O | 0.01 | Yes | I | 1 | | | 1000 | 0.0001 | 80 | 7 | | 7 | 6 |
| p | WCl$_4$•iPr$_2$O | 0.02 | Yes | I | 9 | | | 700 | 0.0071 | 78 | 8 | | 9 | 5 |

*γ-butyro lactone
**acrylonitrile

Example 27

Invention

Polymerization of [IB]=1M. [TMPCl]=0.02 M in hexanes at 0° C. for 20 min Terminated with NH₄OH

| # | LA•LB | [LA•LB] (M) | Yield (%) | Mn | PDI | Mn (NMR) | [PIB] (M) | exo (%) | exo-cpld** (%) | tri (%) | tetra (%) |
|---|---|---|---|---|---|---|---|---|---|---|---|
| a | HfCl₄•iPr₂O | 0.01 | 50 | | | 1500 | 0.0195 | 40 | 13 | 29 | 19 |
| b | HfCl₄•iPr₂O | 0.02 | 100 | | | 1300 | 0.0553 | 52 | 5 | 27 | 17 |
| c* | HfCl₄•iPr₂O | 0.02 | 92 | | | 1500 | 0.0369 | 46 | 10 | 24 | 19 |
| d | HfCl₄•1.5iPr₂O | 0.01 | 15 | | | 650 | 0.0142 | 53 | 24 | 14 | 10 |
| e | HfCl₄•1.5iPr₂O | 0.02 | 34 | | | 600 | 0.0328 | 51 | 25 | 14 | 10 |

*[tBuCl] = 0.02M, terminated with MeOH
**exo-olefin that has coupled (dimerized)

Example 28

Invention

Polymerization of [IB]=1M, by [HfCl₄.iPr₂O]=0.02 M (DCM solution filtered through 450 nm PTFE membrane), [tBuCl]=0.01 M in hexanes at 0° C. Terminated with MeOH.

| # | Time (min) | Yield (%) | Mn | PDI | Mn (NMR) | [PIB] (M) | exo (%) | exo-cpld (%) | tri (%) | tetra (%) |
|---|---|---|---|---|---|---|---|---|---|---|
| a | 5 | 64 | | | 1700 | 0.0229 | 48 | 7 | 25 | 20 |
| b | 10 | 72 | | | 1750 | 0.0247 | 47 | 7 | 27 | 19 |
| c | 20 | 89 | | | 1500 | 0.0352 | 49 | 7 | 24 | 20 |
| d | 40 | 99 | | | 1500 | 0.0403 | 52 | 7 | 23 | 18 |
| e | 60 | 100 | | | 1100 | 0.0534 | 56 | 7 | 22 | 16 |

Example 29

Invention

Polymerization of IB in C₄ feed composition IB=35% 1-butene=10%, 2-butene=6% hexanes=49% at 0° C.

| # | [GaCl₃•iPr₂O] | [TMPCl] | Time (min) | Yield (%) | Mn (NMR) | Mn (GPC) | PDI | exo (%) | PIB-Cl (%) | endo (%) | tetra (%) |
|---|---|---|---|---|---|---|---|---|---|---|---|
| a | 0.01 | 0.01 | 20 | 9 | 900 | 1000 | 1.9 | 55 | 36 | 6 | 2 |
| b | 0.01 | 0.01 | 60 | 10 | 1100 | 1200 | 3.3 | 66 | 21 | 9 | 4 |
| c | 0.02 | 0.01 | 20 | 19 | 1200 | 1700 | 2.5 | 75 | 15 | 7 | 4 |
| d | 0.02 | 0.01 | 60 | 33 | 1500 | 1900 | 2.4 | 85 | 3 | 8 | 4 |
| e | 0.01 | 0.02 | 20 | 18 | 1100 | 1200 | 3.2 | 66 | 23 | 8 | 3 |
| f | 0.01 | 0.02 | 60 | 19 | 1100 | 1300 | 3.1 | 69 | 17 | 10 | 4 |
| g | 0.02 | 0.02 | 20 | 28 | 1300 | 1500 | 2.7 | 81 | 7 | 7 | 4 |
| h | 0.02 | 0.02 | 60 | 36 | 1300 | 1700 | 2.7 | 81 | 7 | 7 | 4 |

Example 30

Invention

Polymerization of IB in C₄ feed composition IB=44% 1-butene=26.4%, trans 2-butene=14.7%, hexanes=14.5% at 0° C.

| # | [GaCl₃•iPr₂•O] | [TMPCl] | Time (min) | Yield (%) | Mn (NMR) | Mn (GPC) | PDI | exo (%) | PIB-Cl (%) | endo (%) | tetra (%) |
|---|---|---|---|---|---|---|---|---|---|---|---|
| a | 0.01 | 0.01 | 20 | 10 | 1200 | 1600 | 3.1 | 64 | 27 | 6 | 3 |
| b | 0.01 | 0.01 | 60 | 14 | 1600 | 1700 | 3.1 | 70 | 17 | 9 | 4 |

-continued

| # | [GaCl$_3$•iPr$_2$•O] | [TMPCl] | Time (min) | Yield (%) | Mn (NMR) | Mn (GPC) | PDI | exo (%) | PIB-Cl (%) | endo (%) | tetra (%) |
|---|---|---|---|---|---|---|---|---|---|---|---|
| c | 0.02 | 0.02 | 20 | 27 | 1400 | 1600 | 2.6 | 74 | 15 | 8 | 4 |
| d | 0.02 | 0.02 | 60 | 46 | 1300 | 1400 | 3.0 | 85 | 4 | 8 | 3 |

While certain representative embodiments and details have been provided to illustrate the invention, it will be apparent to the skilled artisan that various product and process changes from those disclosed herein may be made without departing from the scope of the present invention. The appended claims define the scope of the invention All cited patents, test procedures, priority documents, and other cited documents are fully incorporated by reference to the extent that such material is consistent with this specification and for all jurisdictions in which such incorporation by reference is permitted.

Certain features of the present invention are described in terms of a set of numerical upper limits and a set of numerical lower limits. This specification discloses all ranges formed by any combination of these limits. It is to be understood that the upper limits and lower limits, as well as range and ratio limits set forth herein may be independently combined, and that all combinations of these limits are within the scope of the invention unless otherwise indicated.

What is claimed is:

1. A process for the preparation of polybutene having an exo-olefin content of at least 50 mol. %, wherein a reaction mixture of isobutene or an isobutene-containing monomer mixture in apolar polymerization medium is contacted with a pre-formed complex consisting essentially of a Lewis acid catalyst complexed with an oxygen and/or sulfur-containing Lewis base, and optionally, an amount of a solvent in which said Lewis acid catalyst is complexed with said Lewis base, and initiating polymerization of said reaction mixture with an initiator, wherein said Lewis acid catalyst is a Lewis acid of the formula MR"$_m$Y$_n$, wherein M is a metal selected from Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; and the initiator is a compound of the formula RX, wherein X is a halide; R is a hydrocarbyl group capable of forming a stable carbocation, and wherein the carbon linking group R to group X is tertiary, benzylic or allylic; and wherein said initiator is introduced into the reaction mixture prior to or subsequent to introduction of said catalyst.

2. The process of claim 1, wherein M is Ga or Fe, and R" is a C$_1$ to C$_8$ alkyl group.

3. The process of claim 1, wherein m is 0 or 1.

4. The process of claim 1, wherein Y is Cl or Br.

5. The process of claim 1, wherein said Lewis base is selected from acyclic dihydrocarbyl ethers, wherein each hydrocarbyl group is independently selected from C$_1$ to C$_{12}$ hydrocarbyl, basic cyclic ethers having a 5 to 7 membered cyclic group, dihydrocarbyl ketones, wherein each hydrocarbyl group is independently selected from C$_1$ to C$_{12}$ hydrocarbyl, C$_1$ to C$_{12}$ aliphatic alcohols, C$_1$ to C$_{12}$ aliphatic aldehydes, acyclic aliphatic esters wherein each hydrocarbyl group is independently selected from C$_1$ to C$_{12}$ hydrocarbyl, cyclic aliphatic esters having a 5 to 7 membered cyclic group, dialkyl sulfides, wherein each hydrocarbyl group is independently selected from C$_1$ to C$_{12}$ hydrocarbyl, and basic dihydrocarbyl thiocarbonyl compounds, wherein each hydrocarbyl group is independently selected from C$_1$ to C$_{12}$ hydrocarbyl, and mixtures thereof.

6. The process of claim 5, wherein said Lewis base is selected from acyclic dialkyl ethers, wherein each alkyl group is independently selected from C$_1$ to C$_4$ alkyl, cyclic ethers having a 5 to 7 membered cyclic group, basic dialkyl ketones, wherein each alkyl group is independently selected from C$_1$ to C$_4$ alkyl, C$_1$ to C$_4$ aliphatic alcohols, C$_1$ to C$_4$ aliphatic aldehydes, acyclic aliphatic esters wherein each hydrocarbyl group is independently selected from C$_1$ to C$_4$ alkyl, cyclic aliphatic esters having a 5 to 7 membered cyclic group, dialkyl sulfides, wherein each alkyl group is independently selected from C$_1$ to C$_4$ alkyl, and dialkyl thiocarbonyl compounds, wherein each alkyl group is independently selected from C$_1$ to C$_4$ alkyl, and mixtures thereof.

7. The process of claim 1, wherein said apolar polymerization medium is selected from saturated C$_4$ hydrocarbons, unsaturated C$_4$ hydrocarbons, and mixtures thereof.

8. The process of claim 1, wherein said isobutene or an isobutene-containing monomer mixture is selected from pure isobutene; a C$_4$ refinery cut containing between about 5% and about 50% butene-1, between about 2% and about 40% butene-2, between about 2% and about 60% iso-butane, between about 2% and about 20% n-butane, and up to about 0.5% butadiene, wherein all percentages are by mass, based on the total mass of the C$_4$ refinery cut; and mixtures of pure isobutene and said C$_4$ refinery cut.

9. The process of claim 1, wherein said complex is contacted with said isobutene or an isobutene-containing monomer at a concentration of millimoles of Lewis acid-Lewis base complex per liter of reaction mixture of from about 1 mM to about 200 mM.

10. The process of claim 1, wherein said Lewis acid and said Lewis base are complexed by dissolving the Lewis acid in solvent to form a solution, and then adding said Lewis base to said solution.

11. The process of claim 1, wherein the polymerization process is conducted continuously.

12. The process of claim 1, wherein said polybutene product has an exo-olefin content of at least 70 mol. %.

13. A catalyst-initiator system for catalyzing the polymerization of a reaction mixture of isobutene or an isobutene-containing monomer mixture in apolar solvent to provide a polybutene product having an exo-olefin content of at least 50 mol. %, wherein said catalyst is a pre-formed complex consisting essentially of a Lewis acid catalyst complexed with an oxygen and/or sulfur containing Lewis base, and optionally, an amount of a solvent in which said Lewis acid catalyst is complexed with said Lewis base, wherein said Lewis acid catalyst is a Lewis acid of the formula MR"$_m$Y$_n$, wherein M is a metal selected from Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; and the polymerization is initiated by an initiator of the formula Rx, wherein X is a halide; R is a hydrocarbyl group capable of forming a stable carbocation, and wherein the carbon linking group R to group X is tertiary, benzylic or allylic; and wherein said initiator is introduced into the reaction mixture prior to or subsequent to introduction of said catalyst.

14. The catalyst-initiator system of claim 13, wherein M is Ga or Fe, and R" is a $C_1$ to $C_8$ alkyl group.

15. The catalyst-initiator system of claim 13, wherein m is 0 or 1.

16. The catalyst-initiator system of claim 13, wherein Y is Cl or Br.

17. The catalyst-initiator system of claim 13, wherein said Lewis base is selected from acyclic dihydrocarbyl ethers, wherein each hydrocarbyl group is independently selected from $C_1$ to $C_{12}$ hydrocarbyl, basic cyclic ethers having a 5 to 7 membered cyclic group, dihydrocarbyl ketones, wherein each hydrocarbyl group is independently selected from $C_1$ to $C_{12}$ hydrocarbyl, $C_1$ to $C_{12}$ aliphatic alcohols, $C_1$ to $C_{12}$ aliphatic aldehydes, acyclic aliphatic esters wherein each hydrocarbyl group is independently selected from $C_1$ to $C_{12}$ hydrocarbyl, cyclic aliphatic esters having a 5 to 7 membered cyclic group, dialkyl sulfides, wherein each hydrocarbyl group is independently selected from $C_1$ to $C_{12}$ hydrocarbyl, and basic dihydrocarbyl thiocarbonyl compounds, wherein each hydrocarbyl group is independently selected from $C_1$ to $C_{12}$ hydrocarbyl, and mixtures thereof.

18. The catalyst-initiator system of claim 17, wherein said Lewis base is selected from acyclic dialkyl ethers, wherein each alkyl group is independently selected from $C_1$ to $C_4$ alkyl, cyclic ethers having a 5 to 7 membered cyclic group, basic dialkyl ketones, wherein each alkyl group is independently selected from $C_1$ to $C_4$ alkyl, $C_1$ to $C_4$ aliphatic alcohols, $C_1$ to $C_4$ aliphatic aldehydes, acyclic aliphatic esters wherein each hydrocarbyl group is independently selected from $C_1$ to $C_4$ alkyl, cyclic aliphatic esters having a 5 to 7 membered cyclic group, dialkyl sulfides, wherein each alkyl group is independently selected from $C_1$ to $C_4$ alkyl, and dialkyl thiocarbonyl compounds, wherein each alkyl group is independently selected from $C_1$ to $C_4$ alkyl, and mixtures thereof.

19. The catalyst-initiator system of claim 13, wherein said Lewis acid and said Lewis base are complexed by dissolving the Lewis acid in solvent to form a solution, and then adding said Lewis base to said solution.

* * * * *